May 5, 1936.  C. H. COTE  2,039,779
HOLDER
Filed Jan. 19, 1935
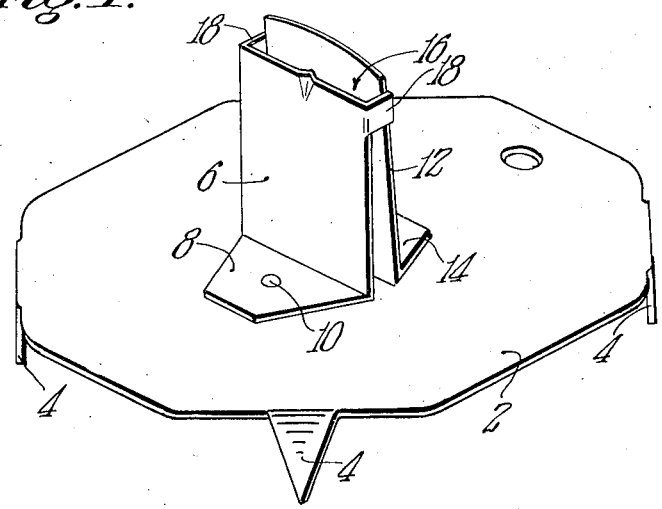
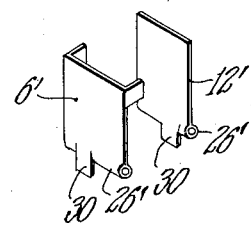
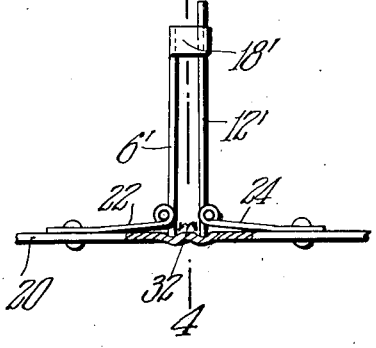
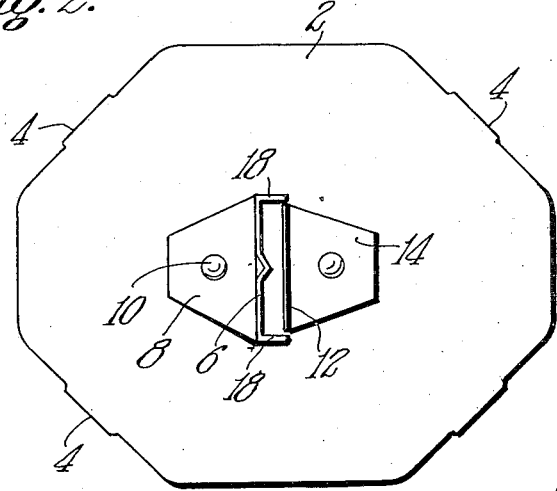
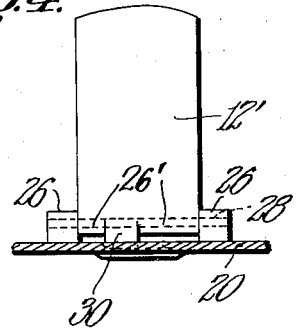
INVENTOR.
Charles H. Cote.
BY
Walter C. Ross.
ATTORNEY.

Patented May 5, 1936

2,039,779

UNITED STATES PATENT OFFICE 2,039,779

HOLDER

Charles H. Cote, Orange, Mass., assignor to
J. F. Simpson, Orange, Mass.

Application January 19, 1935, Serial No. 2,555

3 Claims. (Cl. 248—38)

This invention relates to improvements in apparatus and is directed more particularly to improvements in holding devices for fishing through the ice.

The principal objects of the invention are directed to the provision of a rod holder which is adapted to be located on the ice adjacent a fishing hole and is arranged to securely support the handle or arm of a fishing rod.

According to special features of the invention the holder is simple in form so as to be economical to manufacture and yet by reason of its novel construction it is adapted to securely hold a fishing rod or the like.

Various novel features and advantages of the invention will be hereinafter more fully referred to in connection with the accompanying description of the preferred form of the invention, reference being had to the accompanying drawing wherein:

Fig. 1 is a perspective view of a holder of the class described embodying the novel features of the invention;

Fig. 2 is a plan view of the holder shown in Fig. 1;

Fig. 3 is an elevational view partly in section of a holder showing a modified form of the invention;

Fig. 4 is an elevational view partly in section on the line 4—4 of Fig. 3; and

Fig. 5 is a perspective view at a small scale of the rod engaging plates of the device shown in Figs. 3 and 4.

Referring now to the drawing more in detail, the invention will be fully described.

A base 2 is provided which is preferably of metal and it has a plurality of prongs such as 4 depending therefrom. The prongs 4 are preferably pointed or sharpened as shown so as to be capable of impinging the ice to hold the base in position. These prongs may depend from the base 2 or be attached thereto in any suitable manner.

A side plate 6 extends upwardly from the base and has its lower end attached thereto in some suitable manner as by flange 8 which is secured to the base by a rivet 10 or the like. The flange 8 may be welded to the base if desired. Another upstanding plate 12 has a flange 14 which is secured to the base similarly to the flange 8.

The upper ends of the plates are arranged in spaced relation to form a slot such as 16 therebetween. The plates 6 and 12 are preferably made from material which is more or less spring-like so that the upper ends of the plates may be separated against their spring action. Normally they are relatively close together. This is so that the arm or handle of a fishing rod may be inserted between the ends of the plates while their natural resiliency will cause them to yieldingly bear on the arm or handle of the rod and hold the same so that it is supported above the ice in fishing position.

Ears such as 18 may be provided on the upper end of one of the plates such as 6 which provide end parts of the slot 16 between the plates 6 and 12. These in conjunction with the plates form a substantially closed slot but do not necessarily yield with the separating action of the plates.

The modified form of the invention shown in Figs. 3, 4 and 5 will now be described. A base 20 is provided which is similar to the base 2 and brackets 22 and 24 which are rather spring-like in nature are secured to the base at or near their outer ends in some suitable manner, as by rivets, as shown in Fig. 3. The inner adjacent ends of the brackets are provided with spaced loops or eyes 26 (see Fig. 5) and plates 6' and 12', similar to the plates 6 and 12, have eyes 26' on their lower ends which are disposed between the spaced eyes 26 of the brackets. Pivot pins 28, of common form, pass through the eyes 26 and 26' whereby the plates 6' and 12' are hingedly connected to the brackets 22 and 24.

The plates 6' and 12' which correspond to plates 6 and 12 already described are mounted on the members 22 and 24 as described for a swinging action so that they may be swung from their upstanding position as shown in Fig. 3 to a horizontal position adjacent the base 20.

The members 22 and 24 are more or less spring-like and are formed so that their inner or free ends tend to move towards the base 20. Projections or ears such as 30 extend downwardly from the plates 6' and 12' which are receivable in sockets such as 32 provided in the upper side of the base 20. When the plates 6' and 12' are in their upstanding position the ears 30 rest in the seats 32 to hold the plates in this position in conjunction with plates 22 and 24 which tend to yieldingly urge the ears 30 downwardly. The plates 6' and 12' may be swung away from one another against the action of parts 22 and 24 to their horizontal position so that the holder is in a flat compact relation.

From the foregoing it will be seen that a holder for fishing rod or the like is provided which has a yieldable holding socket for the rod staff or arm, while according to the modification of the invention the members forming the yieldable socket are movable between collapsed and socket forming positions.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A holder of the class described comprising in combination, a substantially flat horizontal base provided with downwardly depending prongs, a pair of substantially flat plate members of spring-like material extending upwardly from said base in spaced relation, ears extending between the upper end portions of said plate members so as to form with said plate members a socket having yieldable walls for yieldingly embracing a fishing rod or the like.

2. A holder of the class described comprising in combination, a substantially flat horizontal base provided with downwardly depending prongs for impinging ice or the like to hold the base in place, a pair of plate members of spring-like material including substantially flat body parts extending upwardly at approximately right angles to said base and flanges on their lower ends secured to said base, the upper end portions of said body parts being arranged in relatively close adjacency, and ears extending between said upper end portions to form a yieldable socket to frictionally embrace a fishing rod or the like.

3. A holder of the class described comprising in combination, a substantially flat horizontal base, a pair of hinge members of spring-like material having outer end portions secured to said base, a pair of substantially flat plate members hingedly connected to the inner adjacent ends of said hinge members for swinging movements between positions in substantial parallelism with and adjacent said base and upstanding positions in spaced relation, engageable means associated with the lower ends of said plate members and said base for releasably holding said plate members in said upstanding positions, and inwardly extending lugs on the upper end portion of one of said plate members for co-operating with the other of said plate members when they are in said upstanding positions to form a socket having yieldable walls.

CHARLES H. COTE.